(12) United States Patent
Mozer et al.

(10) Patent No.: US 8,048,347 B2
(45) Date of Patent: Nov. 1, 2011

(54) METHOD OF MANUFACTURE OF A FOAMED CORE CLASS "A" ARTICLE

(75) Inventors: Wilfried Mozer, Warren, MI (US); Brian L. Desmith, Oxford, MI (US)

(73) Assignee: Delta Engineered Plastics, Auburn Hills, MI (US)

( * ) Notice: Subject to any disclaimer, the term of this patent is extended or adjusted under 35 U.S.C. 154(b) by 0 days.

(21) Appl. No.: 12/934,131

(22) PCT Filed: Mar. 26, 2009

(86) PCT No.: PCT/US2009/038374
§ 371 (c)(1),
(2), (4) Date: Nov. 11, 2010

(87) PCT Pub. No.: WO2009/120850
PCT Pub. Date: Oct. 1, 2009

(65) Prior Publication Data
US 2011/0052899 A1   Mar. 3, 2011

Related U.S. Application Data

(60) Provisional application No. 61/039,489, filed on Mar. 26, 2008.

(51) Int. Cl.
B29C 44/00 (2006.01)
(52) U.S. Cl. .................................... 264/45.5; 264/51
(58) Field of Classification Search ............ 264/5, 45.51
See application file for complete search history.

(56) References Cited

U.S. PATENT DOCUMENTS

| | | | |
|---|---|---|---|
| 3,694,529 A | 9/1972 | Josephsen et al. | |
| 3,773,873 A | 11/1973 | Spaak et al. | |
| 4,133,858 A | 1/1979 | Hayakawa et al. | |
| 4,164,523 A | 8/1979 | Hanning | |
| 4,416,604 A | 11/1983 | Bender et al. | |
| 4,446,185 A | 5/1984 | Waragai et al. | |
| 4,479,914 A | 10/1984 | Baumrucker | |
| 4,500,274 A | 2/1985 | Cyriax et al. | |
| 4,544,340 A | 10/1985 | Hehl | |
| 4,572,856 A | 2/1986 | Gembinski | |
| 4,737,540 A | 4/1988 | Yoshida et al. | |
| 4,892,770 A | 1/1990 | Labrie | |
| 5,037,687 A | 8/1991 | Kargarzadeh et al. | |
| 5,093,053 A | 3/1992 | Eckardt et al. | |
| 5,114,330 A | 5/1992 | Nielsen | |
| 5,282,733 A | 2/1994 | Noritake et al. | |
| 5,403,647 A | 4/1995 | Kaneishi et al. | |
| 5,424,112 A | 6/1995 | Kataoka et al. | |
| 5,441,680 A | 8/1995 | Guergov | |
| 5,449,698 A | 9/1995 | Mabuchi et al. | |
| 5,566,743 A | 10/1996 | Guergov | |
| 5,662,841 A | 9/1997 | Guergov | |
| 5,716,561 A | 2/1998 | Guergov | |
| 5,728,329 A | 3/1998 | Guergov | |
| 5,731,013 A | 3/1998 | vanderSanden | |
| 5,785,110 A | 7/1998 | Guergov | |
| 5,863,487 A | 1/1999 | Guergov | |
| 5,900,198 A | 5/1999 | Hori | |
| 5,985,188 A | 11/1999 | Jennings et al. | |
| 6,019,918 A | 2/2000 | Guergov | |
| 6,103,154 A | 8/2000 | Branger et al. | |
| 6,196,824 B1 | 3/2001 | Foltuz et al. | |
| 6,206,674 B1 | 3/2001 | Foltuz et al. | |
| 6,251,318 B1 * | 6/2001 | Arentsen et al. ............ 264/45.5 |
| 6,328,552 B1 | 12/2001 | Hendrickson et al. | |
| 6,419,289 B1 | 7/2002 | Batten et al. | |
| 6,531,087 B1 | 3/2003 | Hendry | |
| 6,589,458 B2 | 7/2003 | DeCost | |
| 6,645,587 B1 * | 11/2003 | Guergov ..................... 428/35.7 |
| 6,863,329 B2 | 3/2005 | Fero | |
| 6,884,380 B2 | 4/2005 | Yamaki | |
| 6,918,169 B2 | 7/2005 | Mathew | |
| 6,921,571 B2 | 7/2005 | Funakoshi | |
| 6,994,814 B2 | 2/2006 | Moriguchi et al. | |
| 7,077,987 B2 | 7/2006 | Yamaki et al. | |
| 7,083,849 B1 * | 8/2006 | Albrecht et al. .......... 428/304.4 |

(Continued)

FOREIGN PATENT DOCUMENTS

EP    0 481 306    4/1992

(Continued)

OTHER PUBLICATIONS

Endex International, Inc. Endex Structural Foam Molding, General Information Guide, 22 pages, 2006.
Web page printed out on Jan. 21, 2008 from Caropreso Associates, www.caropresoassociates.com/paper2.html, Michael E. Reedy, "Chemical Foaming Agents Improve Performance and Productivity", 9 pages.
Kazmer, D., "Design with Plastics Focus: Injection Molding" 72 pages, web printout Nov. 24, 2008 from www.kazmer.uml.edu/staff/archive/2003/NMW Design with Plastics.pdf.
Web page printed out on Jan. 18, 2008 from www.bergeninternational.com/html/Molding.htm of Bergen International: Molding Tips, "Processing Tips", 5 pages.
Sporrer, A., et al., "Tailored Structural Foams by Foam Injection-Molding with a Specialized Mold", Department of Polymer Engineering, University of Bayreuth, Germany, SPE Foams Conference, 2006, Chicago, Illinois Sep. 12-14, 2006.
Web page print out on Jan. 21, 2008 from www.bergeninternational.com/html/product2.htm, of Bergen International: Processing Tips, "Product Guide", 5 pages.

(Continued)

Primary Examiner — Christina Johnson
Assistant Examiner — Galen Hauth
(74) Attorney, Agent, or Firm — Brooks Kushman P.C.

(57) ABSTRACT

The method of manufacturing an article having a surface, a skin, and a core includes closing a first mold portion on a compressible seal. The seal is disposed between the first and second mold portions. The portions define a pressurizable mold cavity having a spaced apart injection port and a vent. The mold cavity is pressurized at a first pressure greater than atmospheric pressure. Molten plastic and blowing agent are injected form gas cells within the mixture. The gas cells have an internal pressure exceeding the first pressure. After waiting for a first period, the pressurizing gas is vented for a second period at a rate sufficient to rupture the gas cells which form a skin adjacent to the mold cavity wall. The skin defines a core cavity filled with the foamed mixture, which is solidified. The mold portions are separated releasing the article.

17 Claims, No Drawings

U.S. PATENT DOCUMENTS

| | | |
|---|---|---|
| 7,204,685 B1 | 4/2007 | Crain et al. |
| 7,294,295 B2 | 11/2007 | Sakamoto et al. |
| 2001/0021457 A1 | 9/2001 | Usui et al. |
| 2001/0041245 A1 | 11/2001 | Funakoshi |
| 2004/0013846 A1 | 1/2004 | Kugimiya et al. |
| 2005/0127579 A1 | 6/2005 | Suzuki |
| 2005/0230861 A1 | 10/2005 | Takatori et al. |
| 2009/0246471 A1 | 10/2009 | Zawacki et al. |

FOREIGN PATENT DOCUMENTS

| | | |
|---|---|---|
| EP | 0593308 | 4/1994 |
| EP | 0 925 895 | 6/1999 |
| GB | 1169394 | 11/1969 |
| JP | 56060239 | 5/1981 |
| JP | 7077739 | 8/1995 |
| JP | 10146872 | 6/1998 |
| JP | 11179752 | 7/1999 |
| JP | 2001322433 | 11/2001 |
| JP | 2007269002 | 10/2007 |
| KR | 10-2007-0034186 | 3/2007 |
| WO | 00/38899 | 7/2000 |
| WO | 00/38900 | 7/2000 |
| WO | 01/62486 | 8/2001 |
| WO | 02/078925 | 10/2002 |
| WO | 2009/120838 | 10/2009 |
| WO | 2009/120850 | 10/2009 |

OTHER PUBLICATIONS

Ampacet Bulletin, "Employee Azodicarbonamide as a Nucleating Agent in Thermoplastic Foams" from www.ampacet.com/EN/global/tutorials.html?lang=EN.

Ampacet Product Information sheet, "701039-H Foam EVA MB" dated Aug. 10, 2004.

Web page print out on Feb. 14, 2008 from www.iplas.com/USA, International Plastic Laboratories and Services, "Determining Clamp Requirements", 3 pages.

Sales Presentation Sheet, "Mucell Brings Two Key Strategic Benefits to our Key Targeted Markets", from www.trexcel.com/imsales_salesrepresentation, 2007, 44 pages.

Ranade, et al., "Structure-Property Relationships in Coextruded Foam/Film Microplayers", Journal of Cellular Plastics, vol. 40, Nov. 2004, pp. 497-505.

Web page printed out from www.CaropresoAssociates.com, Caropreso, "Molding with Counterpressure; A Cost Savings Option to Increase Productivity", 9 pages.

Ampacet Product Information sheet, "701253-W Foam PE MB", dated May 3, 2004.

Ampacet Product Information sheet, "10123 Foam PE MB", dated Apr. 29, 2004.

Ampacet Product Information sheet, "701054-S Foam EVA MB", dated May 3, 2004.

Ampacet Product Information sheet, "701709-H Foam PE MB", dated Oct. 20, 2004.

International Search Report for PCT/US2009/038358 dated Mar. 26, 2009.

International Search Report for PCT/US2009/038374 dated Mar. 26, 2009.

Bregar, Bill, Deal Adapts MuCell for Glossy Auto Parts, Plastics News, Nov. 15, 2010.

Web page printed out on Feb. 16, 2010 from Intellimold—http://www.intellimold.com/getpage.asp?pg=xtralite-01&mn=otherapps Published Jul. 26, 2003—2 pages.

* cited by examiner

METHOD OF MANUFACTURE OF A FOAMED CORE CLASS "A" ARTICLE

CROSS-REFERENCE TO RELATED APPLICATIONS

This application claims the benefit of U.S. provisional application Ser. No. 61/039,489 filed Mar. 26, 2008.

BACKGROUND OF THE INVENTION

1. Field of the Invention

The present invention relates to the method of manufacture of a foamed core article with a Class A visible surface and with integral structural reinforcements on the non-visible back surface beyond current manufacturing capabilities.

2. Background Art

Designers often use plastic parts as replacements for metal parts to take advantage of the greater design freedom that molded parts can give and to reduce the weight and cost of an article. The injection molding process is used to produce such plastic articles. But when injection molding relatively large articles, such as heavy truck fascias, the clamping force needed to seal the mold and to inject the amount of plastic material that is required to fill the mold cavity, requires tremendous pressures to produce a usable part. Injection molds and molding machines that can produce these parts are very large and heavy and are extremely expensive to acquire and to operate. These pieces of capital equipment must routinely be amortized over the number of pieces that are produced therein. To date, the costs have been greater than heavy truck manufacturers have been willing to incur for their short run, low volume programs. As a result, manufacturers have either limited the size of the parts that are injection molded or they have opted for other, less expensive, processes to produce the large parts.

In an effort to injection mold large parts without the full expense that is required for normal injection molds and machines, manufacturers have produced large functional plastic parts by injecting a molten mixture of plastic and a blowing agent into a mold cavity. By adding a foaming agent to the plastic resin during injection molding process, the foaming action creates localized internal packing pressure that forces the melt to fill the part cavity. The addition of the foaming agent to the molten resin expands the volume of the injected melt and thereby reduces the amount of material used, per shot. By reducing the density of the melt, the weight of the article that is molded is also reduced. A further benefit of adding blowing agent to the melt, with the resulting foaming action in the cavity, is that the need for extreme external injection pressure and the related clamping pressure, to keep the mold closed, is greatly reduced. The net result is that a high-pressure molding process is now converted to a low-pressure molding process. Despite these benefits, there are drawbacks that prevent the foamed plastic process from being widely used to manufacture Class A structural parts. These are:

the internal packing pressures of the foamed plastic process do not always yield surfaces that are free of surface porosity and local shrinkage deformities, and because the foam swirls on the surfaces of the molded part, the foamed plastic process is not capable of yielding the desired Class A surface that is necessary for visual parts.

SUMMARY OF THE INVENTION

The present invention relates to a method of manufacture of a foamed core article with a Class A visible surface and with integral structural reinforcements on the non-visible back surface beyond current manufacturing capabilities.

The method for use in manufacturing an article having a surface, a skin, and a core includes closing a first mold portion upon a compressible seal. The seal is positioned between the first mold portion and a second mold portion. The first and second mold portions each have a wall defining a pressurizable mold cavity. The mold cavity has a mold cavity wall, an injection port, and a vent. The injection port and the vent are spaced apart.

The method further includes pressurizing the mold cavity using a pressurizing gas at a first pressure that is greater than atmospheric pressure. Through the injection port, a mixture of molten plastic and a blowing agent is injected. A blowing agent gas is generated to form gas cells within the mixture. The gas cells have an internal pressure exceeding the first pressure. The method includes a first waiting period. For a second period after the first period, the pressurizing gas is vented through the vent at a rate sufficient to rupture a portion of the gas cells in order to produce ruptured cells. The skin is formed adjacent to the mold cavity wall using the ruptured cells. The skin defines a core cavity which is filled with the mixture. The mixture is then solidified. The first mold portion is separated from the second mold portion in order to release the article.

In another embodiment, the method includes closing the first mold portion upon a second mold portion. The first and second mold portions define a pressurizable cavity having a mold cavity wall, an injection port, and a vent. The injection port and the vent are spaced apart. At least one mold portion further includes a rib having a width. The mold cavity is pressurized to a first pressure. A plastic composition is injected through the injection port into the mold cavity. A blowing agent is provided into the plastic composition to form a mixture. The blowing agent causes the plastic composition to foam. The foam has gas cells with an internal pressure exceeding the first pressure. The method includes waiting for a first period. The mold cavity is vented to a second pressure which is less than the gas cells' internal pressure. The second pressure is reduced at a predetermined rate forming a skin contacting the mold cavity wall. The skin has a thickness. The ratio of the mold cavity's rib width to the skin's thickness ranges from 50% to 300%. The skin defines a core cavity which is filled with the plastic composition and blowing agent gas mixture. The mixture is solidified. The first mold portion is separated from the second mold portion in order to release the article.

In another embodiment of the invention, the method includes counter-pressuring in a mold having walls defining a mold cavity using a first gas having a first pressure. The first gas is provided to the mold cavity before injecting a plastic composition containing a decomposable blowing agent. The blowing agent is decomposed creating a second gas having a second pressure. The first pressure exceeds the second pressure. The plastic composition is expanded in the mold cavity by reducing the first pressure to a third pressure. The third pressure ranges from atmospheric pressure to less than the first pressure.

DETAILED DESCRIPTION OF THE PREFERRED EMBODIMENT(S)

Except in the operating examples, or where otherwise expressly indicated, all numbers in this description indicating material amounts, reaction conditions, or uses are to be understood as modified by the word "about" in describing the invention's broadest scope. Practice within the numerical limits stated is generally preferred. Also, unless expressly stated to the contrary:

percent and ratio values are by weight;

a material group or class described as suitable or preferred for a given purpose in connection with the invention implies any two or more of these materials may be mixed and be equally suitable or preferred;

constituents described in chemical terms refer to the constituents at the time of addition to any combination specified in the description, and does not preclude chemical interactions among mixture constituents once mixed; and an acronym's first definition or other abbreviation applies to all subsequent uses here of the same abbreviation and mutatis mutandis to normal grammatical variations of the initially defined abbreviation.

One embodiment of a method for forming a relatively large molded foam structural article includes injecting a melted plastic having a blowing agent additive into a matched metal mold. To minimize shrink-related surface sinks and reduce the amount of clamp force needed, the article is made of foamed plastic. The foaming action substantially eliminates the need for external packing of the injected plastic to completely fill a mold cavity. Reducing or eliminating the need for external packing significantly reduces the clamp tonnage required to injection mold the part. Lower clamp tonnage means that articles with larger surface areas may be molded with less machine clamp pressure.

Exemplary of a relatively large article is a vehicle component, especially a truck body component, such as a bumper fascia. Such a part has a surface area that may be over 2000 in$^2$ (12,900 cm$^2$). The standard injection molding process for such a part, without any blowing agent, would require the use of an expensive steel mold that is capable of withstanding repeated and extreme clamping pressures and an injection-molding machine having a clamp tonnage rating of at least 5000 tons (44,500 kiloNewtons (kN)). The advantage of the foamed plastic molding process, then, is to enable the manufacture of large structural parts without the need for a more expensive steel mold and without the need for extreme machine clamping pressures. It is understood that this combination of process and materials is suitable for making articles having areas of at least 100 in$^2$ (650 cm$^2$), 500 in$^2$ (3225 cm$^2$), and 1000 in$^2$ (6450 cm$^2$) or more.

One embodiment of the inventive process is based on the use of a particularly advantageous material mixture of a plastic matrix including a molding resin, such as thermoplastic polyolefin (TPO), like LYONDELLBASELL SEQUEL #1715, which has a production number of #1980HI. The mixture includes a chemical blowing agent such as an exothermic blowing agent having an azo-type nucleating agent. The mixture may optionally include a mechanically injected blowing agent such as a gaseous or liquid fluid. Blowing agents serve to generate gas bubbles in the melt stream of the process. The degree to which these components interact to form a foamed melt stream is dependent on the concentration of the foaming agent in the molten resin. To achieve the physical properties for this embodiment, a concentration of 1% foaming agent was used and yielded an overall material density of 97%. By increasing the amount of decomposable chemical or mechanical blowing agent that is introduced into the molding resin, it is possible to influence the degree of nucleation and resulting internal packing pressure in order to reduce the amount of molding resin in the mold cavity to achieve a wide range of material densities in the molded part.

It is understood that an endothermic solid or binary solid blowing agent may also be suitable.

In this embodiment, the overall part density of 97% is achieved with a molding process that had an injection extruder temperature profile of 400/410/420/410° F.). (204/210/216/210° for four zones starting from the zone adjacent to a hopper to the zone adjacent to the mold with a nozzle temperature of 400° F. (204 C) and a mold temperature of 125° F. (52° C.). The test mold is run in a 500 ton Van Dorn press with a 60 fl. oz. (1775 cm$^3$) barrel that is equipped with a shut-off nozzle that has a ¾ inch (1.9 cm) diameter flow channel. In order to establish a baseline clamp pressure for this mold, Sequel #1715 TPO molding resin, without foaming agent, is injected into the mold cavity to verify that a full 500 tons (4450 kN) of clamp pressure are required to mold a fully packed-out, sink-free part without flash at the parting line. A typical dimensional calculation for a part that has a line-of-draw footprint of approximately 7.0 in. (18 cm) by 23.5 in. (60 cm), using a clamping factor of 3.0 tons per square inch (41 mega Pascals (MPa)), confirms that a 500 clamping ton (4450 kN) machine is required to contain the standard injection process for a part of this size.

With the addition of 1 wt % of the Ampacet #701039-H exothermic foaming agent to the Sequel #1715 TPO resin, the machine clamping pressure can be reduced to 100 tons (890 kN) and achieve the same flash-free, sink-free part as previously produced with 500 tons (4450 kN) of clamp pressure; an 80% reduction. The pack out or boost pressure is purposely kept at zero or a very low pressure to permit the nucleating cells of the foam to expand as freely as possible within the part cavity walls. In one embodiment, the pack out pressure is between 1 psi (12 Pa) and about 75 psi (936 Pa). Even though the pack out pressure is zero or very low, the injected thermoplastic foam mixture continues to fill the cavity because the outward pressure applied by the effervescing gas from the blowing agent causes the thermoplastic foam mixture to continue to expand until it reaches the part cavity wall.

The reduced clamping pressure requirement for the foamed-resin molding process further reduces the compressive force resistance needed for a mold building material. As a result, the mold building material may be switched from tool steel to a lighter weight and/or lower cost material, such as aluminum or magnesium-based material. Aluminum, for example, has the additional benefit of relatively greater thermal conductivity than tool steel. Increased thermal conductivity reduces the process cooling time through better heat dissipation and serves to shorten the overall cycle time for the process. For example, using aluminum means molds are lighter to handle and more easily machined. Improved handling and machining have a very beneficial impact on the economics of the molding process. Therefore, the foamed-resin molding process provides substantial tooling advantages over the standard injection molding process.

Another benefit of the foamed-resin molding process is its ability to minimize the surface deformities in injection-molded articles that are commonly known as shrinkage sinks. The article often has two opposed surfaces. An "A" surface is a show surface that may be aesthetic. A "B" surface often does not need the good appearance relative to the "A" surface. In articles that are produced by a standard injection molding process using solid thermoplastics, these deformities may typically occur on a flat surface that may be a class "A" surface. These deformities may not be aesthetically acceptable. The deformities typically are located on the opposite surface from a feature that makes the cross section of the article somewhat thicker and consequently has more mass. In the case of articles that are molded out of solid resin, these areas of greater mass also tend to cool relatively slowly when compared to the surrounding thinner wall areas. Without wishing to be tied to any particular theory, the deformities, such as sink marks, may occur because the greater mass areas contain more heat and therefore cool more slowly than the relatively thinner wall areas. The molding resin is able to continue to shrink for a relatively longer period of time and for a relatively greater distance as it seeks thermal and dimensional equilibrium with its surrounding mass of plastic.

By adding the foaming agent to the molding resin, molecular chains of the resin are interrupted by nucleated cells with their relatively thin cellular walls. The nucleated cells may result in decreased shrinkage strength in the molding resin. The thinner wall section has less mass and contains less heat than thicker wall sections. The faster the wall section cools, the less time is available for the wall to continue to shrink. In addition to interrupting the molecular shrinkage forces, the nucleated cells provide an additional deterrent to shrinkage in that the generated gas nitrogen, which forms the bubbles to make the foam, for example, provides a minuscule amount of internal gas pressure that tends to expand the newly formed cell in the molten resin matrix. A combined effect of adjacent newly-formed cells may generate sufficient outward pressure to counteract the shrinkage forces of the cell walls. Counteracting the shrinkage forces in a layer of nucleated cells may limit surface sinks on the adjacent surface.

The foamed-resin injection molding process does not rely on the mechanical packing of the resin in the cavity to achieve the fully developed article, i.e., without sinks Eliminating mechanical resin packing and using only the normal pressure of expanding resin foam may reduce or eliminate related stress gradients that normally exist from the injection point to the point of last fill. As a result of the localized packing of the part through the expanding cell nucleation, the article has minimal stress gradients. The molded article often does not exhibit warp because of the minimal stress in the foam material. The article also tends to shrink less along material flow paths and is therefore dimensionally more stable.

While the foamed-resin injection molding process typically serves to make a sink-free article with considerably less clamping pressure that is applied to a more thermally efficient and less expensive injection mold, the resulting article exhibits the full foam-resin matrix on its surface and cannot be considered to achieve a visual class "A" surface. The same cell structure that interrupts the tendency of the molding resin to shrink also serves to compromise some of the physical performance properties of the molding resin. The inherent physical properties of a thermoplastic resin are based on the molecular proximity of one molecule to another in the resin matrix. Both of these issues, the porous surface and the reduced physical properties, however, can be overcome, to some degree, by pressurizing the mold cavity with a gas that has a greater pressure than the internal pressure of the foam cells.

In at least one embodiment of this invention, compressible seals are applied to the mold at the parting line and any other slides, cores, lifters, ejector pins that penetrate the mold block, as needed, to prevent leakage of gas from a sealed mold cavity having a pressure in excess of atmospheric pressure. The sealed mold cavity receives a pressurizing gas to increase the pressure inside the mold cavity above atmospheric pressure. The injection of the foamed molten resin is delayed until the mold cavity reaches a pressure in the range that is independently determined and selected from 50, 80, 90 psi (625, 1000, 1125 Pa) to 120, 150, and 200 psi (1500, 1875, and 2500 Pa) to suit the application. During injection of the molten plastic and blowing agent into the pressurized mold cavity through a gate, the expansion of blowing agent gas within the resin foam in the mold cavity remains relatively minimal and controlled tightly by the injection unit extruder and then by the pressuring gas' backpressure. The pressuring gas may be released or withdrawn following a waiting period, such as a venting delay, lasting more than 1.5 seconds, 5 seconds, or 7 seconds, during which the pressurized gas ruptures the cell walls that are directly exposed to this pressurized gas and allowing the molten resin to flow together and form a relatively thin wall of solid resin on top of the underlying foamed resin. As the thickness of the molding resin skin increases, the pressurized gas in the mold cavity is less able to reach the new underlying cells to rupture their walls, allowing these cells to form and grow. Once the desired skin thickness has been achieved, the releasing or withdrawing of the gas from the pressurized mold during a depressurization period may be either a controlled process, such as through a pressure relief valve, or an uncontrolled process, such as through an atmospheric vent or into a recovery vessel. Once the gas pressure has been reduced to an ambient level, the underlying foamed resin is then free to nucleate and expand to fill the mold cavity. It is understood that the article may have skins on more than one side. Skins may occur adjacent any mold cavity wall or insert.

The range of hold times can be independently selected from 1 second, 5 seconds, 10 seconds, 16 seconds, and 20 seconds to 20 seconds, 30 seconds, 40 seconds, or 50 seconds, depending on a desired skin and foam core structure distribution. After a hold time in which the article completely solidifies, the mold may then be opened and the molded foam core article, such as the relatively large part for a vehicle body, can be removed. The foamed body has a relatively thick skin layer and a foamed core layer. The foamed core layer thickness range may be selected from greater than 1 mm, 2 mm, and 3 mm to less than 50 mm, 40 mm, 30 mm, 20 mm, 10 mm, and 5 mm as dictated by part design. The skin layer is sufficiently thick to prevent cells of the foamed core layer from being visible or evident in the skin layer. The weight reduction range may be independently selected from greater than 1, 2, and 3 wt % to 5, 7, 10, 20, and 30 wt % to suit the needs of the molded article.

In at least one embodiment, the counter-pressure gas venting is delayed for a period ranging from about 1.5 seconds to about 10 seconds after the shot has been completely injected into the mold. In another embodiment, the venting delay is about 3 seconds to about 8 seconds. A profile of the venting delay, a venting period of the pressurizing gas, and/or a pressure graph of the counter-pressure in the mold during the venting period helps assess the resulting article's structure, especially for the skin thickness and foamed core. The greater the counter-pressure pressurizing gas' pressure, the thicker the skin will be. The greater the waiting period until venting, the thicker the skin will be. The profile may be used to set up gradient of properties in the articles through control of the diameters and quantities of voids generated. The profile may need to be developed in conjunction with the cooling properties of the mold and part design. By applying gas counter-pressure to the foamed-resin injection molding process, it is now possible to manufacture an article that has a low-pressure molded foam core with a solid skin on each side to improve the aesthetics of the article to a class "A" level and to impart most of the original physical properties of the original unfoamed thermoplastic to the general structure of the article.

In addition to regaining nearly all of the physical properties of unfoamed resin, a new sandwich structure of skin/foam core/skin is able to gain additional strength from the geometric nature of the sandwich section. This type of structure is able to achieve a higher flexural modulus than solid sections of equal resin weight, but at a reduced material density. This flexural modulus may be calculated with the following formula:

$$\text{sandwich structure flexural modulus } \alpha \text{ (sandwich thickness)}^3$$

An example of the resulting article is the truck bumper fascia having a skin of at least 1.5 mm thickness adjacent to and around a central foamed core. The visible front skin is the show surface, referred to as the "A" surface, which is supported by the central foamed core, which also supports the backside skin, referred to as a "B" surface, and typically provides attachment features. The skin and foamed core, in the present embodiment, are injection molded out of a 1 wt % mixture of Ampacet #701039-H chemical foaming agent and durable LYONDELL BASELL Sequel #1715 TPO, which has a benefit of resisting damage from point impacts typical of debris originating on a highway. A further advantage of the combination of material and method arises from being capable of forming mounting bosses and large structural ribs with a skin-foam-skin structure on the fascia's B-side. But, the creation during the molding process of solid molding resin as the skin on the fascia may again yield shrinkage-related sink issues on the solid surfaces of the fascia, in the locations opposite of the heavy structural ribs on the back of the fascia structure. The uneven shrinkage of the molding resin needs to be addressed in order to produce a structural article that has a sink-free class "A" surface opposite from a large structural ribs and a boss on the "B" surface.

Most thermoplastic molding resin manufacturers have published a rib size to wall stock recommendations of approximately 25% for TPO to avoid sink issues in standard molded articles. It is understood that the currently recommended rib to wall-stock thickness ratio maybe as great as 45% depending upon the plastic used. As that ratio increases beyond the recommendations, the greater concentration of heat in the larger mass continues to cool more slowly to ambient, material shrinkage continues longer in the larger mass sections than in the surrounding thinner sections. The resulting delay in arriving at the ambient temperature allows the front surface to be drawn longer and further inward thereby causing a surface distortion, such as a sink mark.

The structural article with large "B" surface structures, such as a Class 8 Heavy Truck Fascia can be molded using gas counter-pressure with foamed thermoplastic olefin or any other crystalline, semi-crystalline or amorphous molding resin. The resulting part has thicker than normal wall-stock of about 6 mm but with a range independently selected from of 1-10 mm or about 6 mm or greater. Large ribs that are far in excess of the recommended rib size to wall-stock ratio for TPO may be molded in, too. Proportionate increases in the ratio may be expected with the inventive process when using other plastics.

With the combination of counterpressure and foamed TPO, the ratio of rib size to wall-stock may be as great as 50%. Surprisingly, the combination of this method and this material, when combined with the use of fillets on the ribs and projections on the "B" surface of the mold surface, results in the desired Class "A" surface for TPO when the rib width to wall-stock thickness ratio is about 300% or more. The rib width to wall-stock thickness ratio may range from ratios independently selected from greater than 25%, 50%, or 75% to 1000%, less than 1000%, or 100%. The addition of the oversize ribs helps to improve the structural integrity, both strength and stiffness, of the fascia. Further oversized ribbing is also added to the backside of the part to accept the attachment brackets that are used to mount the part to the truck chassis. This combination is advantageous in the class A fascia is designed in such a way that no additional stiffening structures or braces are required beyond the mounting brackets. This saves the manufacturers on the cost of the additional structures. It also helps the designers to avoid using separate components such as backer beams to mount the fascia in order to attain the necessary structural integrity. A further advantage is that the dimensional stability of the fascia may improve by eliminating molding induced stresses. Reducing the stresses may increase the fascia's structural durability, especially with respect to cracking and crack propagation. This is especially advantageous when over-molding an insert of foreign material such as metal, plastic or non-plastic reinforcing components at mounting hole locations.

Many types of polymers and polymer compositions may be used as a plastic matrix for the skin and foamed core layers with this process. Non-limiting examples of the compositions may include, thermoplastics, and lightly cross-linked thermoplastics. Plastics selected for the foamed core article may be chosen based on their physical properties and melting characteristics. For example, the truck bumper fascia may have a relatively elastomeric material having the advantage of being durable relative to small point impacts typical of debris kicked up from a roadway. Non-limiting examples of durable plastics may include structural foam comprising amorphous plastic, an olefin, thermoplastic polyolefin, and a thermoplastic elastomer. It is understood that these polymers may include blends of various plastics, as well as comprise reinforcements and additives like plasticizers, rubber tougheners, grafts, functional fillers, and fillers. Multiple injections of the same or different plastics and/or blowing agents without opening the mold may not occur without violating the spirit of the invention.

In order to generate the plastic matrix having a number of voids, the blowing agent is typically added to the plastic before the plastic is melted, although it may be added during or even after melting of the plastic matrix. Blowing agents may include a chemical blowing agent such as an endothermic solid, an exothermic solid, and a binary solid; and/or a physical blowing agent, such as a liquid that is infused or dissolved in the plastic matrix, a core-shell combination of a blowing agent inside of a plastic shell, and/or a gas injected or dissolved under pressure into the melted plastic. In one embodiment, the amount of foaming agent added to the thermoplastic material is about 0.5 wt % or greater, depending on the application. In an additional embodiment, the foaming agent is about 1 wt % or greater.

A non-limiting example of the exothermic blowing agent is an exothermic foam concentrate. A foam concentrate may include a heterogeneous nucleating agent. An example of the heterogeneous nucleating agent is an azo-type nucleating agent, such as modified azodicarbonamide (ADC), which is sold as a chemical blowing agent such as product #701039-H by Ampacet Corporation. ADC benefits from releasing nitrogen gas versus carbon dioxide. Nitrogen gas has a relatively low molecular weight, making it more reactive. Nitrogen's better foaming properties means that masterbatch of plastic and ADC uses only 20 wt %. ADC versus the more typical 50 wt % for carbon dioxide generating chemical blowing agents. Chemical blowing agents and exothermic foam concentrates may also be used in conjunction with physical blowing agents. Other examples of nucleating agents include particulate solids such as talc or silica.

Nucleating agents generally lead to relative finer cell structure than when no nucleating agent is used. Finer cell structure may result in a 1-15 absolute percent reduction in density of the plastic matrix relative to the density that may be achieved using talc. ADC, when finely dispersed in the melted plastic, may produce a very fine cell structure including a micro-cellular structure. An absolute weight reduction of 39% or less may be obtained using the azo-type nucleating agent. Typically, the average cell diameter, when using ADC as the nucleating agent, may range from about 0.1 mm to about 0.5 mm. The cell diameter may be reduced further by suppression of the cell growth by the counter-pressure. The cell size range may be selected independently from 0.035 mm, 0.050 mm, 0.075 mm, and 0.1 mm to 0.3 mm, 0.4 mm, 0.5 mm, 0.7 mm, and 1 mm.

When using a nucleating agent such as ADC, it is important to carefully control the temperature of the machine used to blend melted plastic with the nucleating agent and the temperature of the mold. It is desirable that the nucleating agent is activated immediately before foaming is desired. Premature activation may result in the loss of effectiveness of the nucleating agent. A gas generation range may be selected independently from 165, 170, 180, or 200° C. to 215, 200, 182, or 175° C. The maximum processing temperature may range from 230° C. to 260° C. or as high as 10° C. below the degradation temperature of the plastic. The foaming agent concentrate or any other chemical blowing agent may be diluted in the plastic matrix (a letdown ratio) in a range independently selected from 0.1, 1, 2, 5 wt % to 10, 20, 30 wt %. The plastic into which the foaming agent concentrate or any other chemical blowing agent is blended may be in the injection molding grade range. As an example of injection molding grade properties, a melt index before addition of additives and blowing agents may range from 5 to 100 gm/10 min when measured by the method ASTM D1238 condition L.

EXAMPLE 1

A TPO resin, SOLVAY SEQUEL production number 1715, is used as a plastic resin matrix. This resin is based on SEQUEL number 1980HI, an engineered polyolefin, having a low coefficient of linear thermal expansion. Polyolefin is mixed with 1 wt. % of the exothermic chemical forming agent supplied by AMPACET number 701039-H, which comprises about 20% of a modified ADC.

EXAMPLE 2

PHOENIX PLASTICS provides a masterbatch formulation using a polyolefin. CELL-SPAN 1000 uses a polyolefin polymer formulated with supramolecular chemistries which allow formulation of directional hydrogen bonds that emulate the stronger covalent bonds. The foaming agent used in the CELL-SPAN product line includes the function of the nucleating agent. The letdown ratio is 1%, but could be as little as 0.2% by weight. CELL-SPAN 1000 is an endothermic chemical foaming agent. It is intended to yield a small cellular structure instead of a fine cell diameter structure.

EXAMPLE 3

TPO resin SOLVAY SEQUEL production number 1980HI blends with 1% of TECHMER TECHSPERSE type TRCEN40310ES to form a masterbatch.

EXAMPLE 4

TPO resin from SOLVAY SEQUEL production number 1980HI, which is derived from SEQUEL number 1715, comprises the control material.

EXAMPLE 5

Articles in this example, six inch by eight inch (48 in$^2$, 310 cm$^2$) plaques, are molded from materials used in Example 1, 2, 3, and 4 with conditions and results provided in Table 1.

TABLE 1

|  | TPO RESIN: Solvay Sequel #1980 HI (Sequel #1715 | TECHMER TRCEN40310ES | PHOENIX PLASTICS CELL-SPAN #1000 | AMPACET #701039-H |
|---|---|---|---|---|
| Press Type & Size | 300 ton Van Dorn | 300 ton Van Dorn | 300 ton Van Dorn | 300 ton Van Dorn |
| Clamp Force: | 300 tons | 75 tons | 75 tons | 75 tons |
| Mold Temperature: | 130 F. | 110 F. | 145 F. cavity/135 core | 125 F. |
| Melt Temperature by Zone: | 400/410/420/400 F. | 400/410/410/410 F. | 400/410/420/410 F. | 400/410/420/410 F. |
| Shot Size: | 6.2 in. | 5.6 in. | 5.4 in. | 6.0 in. |
| Shot Speed: | Fast | 4.1 | 1.34 | 10.59 |
| Cycle Time: | 90 sec. | 80 sec. | 80 sec. | 120 sec. |
| Gas Cntr. Press. | N/A | 90 psi | 50 psi | 150 psi |
| Gas Release Delay | N/A | 3 sec. | 3 sec. | 3 sec. |
| Boost Pressure: | 2000/75 | 2000/177 | 2000/322 | 2000/180 |
| Hold Pressure: | 400 psi | 25 psi | 5 psi | 50 psi |
| Hold Time: | 15 sec. | 20 sec. | 5 sec. | 30 sec. |
| Back Pressure: | 80 psi | 80 psi | 100 psi | 100 psi |
| Cure Time: | 60 sec. | 50 sec. | 50 sec. | 55 sec. |
| Screw RPM: | 150 | 150 | 175 | 175 |
| Melt Control: | good | good | good | drool |
| Part Issues: | none | none | none | post blow tendency |
| Part Weight: |  |  |  |  |
| 5.0 mm | 0.360 lb. | 0.335 lb. | 0.355 lb. | 0.356 lb. |
| % Change | 0 | −7.00% | −1.14% | −1.12% |
| 7.0 mm | 0.477 lb. | 0.447 lb. | 0.465 lb. | 0.466 lb. |
| % Change | 0 | −6.30% | −2.50% | −2.30% |

With the use of chemical foaming agent, the clamp force is reduced from 300 tons force (2670 kN) to 75 tons force (667 kN) or up to about 75%. The shot size is reduced in a range of 3 wt % to 13 wt % when a foaming agent was added to the TPO relative to the original TPO control. However, the shot time increases up to 10.59 seconds and ranged from 1.34 to 10.59 seconds. As a consequence, the cycle time also increases by 30 seconds or up to 33%. The gas counterpressure ranges from 50 to 150 psi (349-1034 kPa). It should be understood that additional combinations of shot size, shot speed, and gas counterpressure could be used depending upon the resulting product and its specifications.

In this set of examples, the counterpressure gas is withdrawn over a period of about 3 seconds. The hold time which contributes to the cycle time increased as much as 15 seconds or 100% using the chemical foaming agents. The material from Example 1 tends to exhibit a tendency to foam beyond the hold time. The plaque parts exhibit a reduction in weight of about 1% to about 7%.

With the Example 1 material, it is surprising that additional gas counterpressure is necessary to make the skin thick enough to hide the cell structure and provide a Class A surface. The increased counterpressure ranges from a 25% increase to as much as a 300% increase relative to other chemically blown TPOs. The foaming agent shows surprisingly drastic difference in the chemical foaming agent reactivity when using Example 1 relative to Examples 2 and 3. The foam layer continues to foam well despite the relatively greater counterpressure. This results in the plaque sample having the relatively thick skin desired for durability and the relatively uniformly distributed foam cells of very fine cell diameter. The cells are desirably isotropic in shape, also.

EXAMPLE 6

A foam expansion trial is performed using the material from Example 1. In order to determine the limit of the foams expansive capability, a 5.0 mm cavity is filled with enough resin and foam mixture to yield an acceptable plaque. The same shot volume is then injected into a 7.0 mm cavity and allowed to foam to its natural limits in the presence of gas counter-pressure of 150 psi (1034 kPa). If the resulting plaque is of acceptable quality the shot size is adjusted down to the point where the foam attains a minimal density and still yields an acceptable plaque. If the resulting plaque is not acceptable in terms of quality because it is a short shot, the shot size is adjusted up to the point where the foam attains a minimal density in yields of acceptable plaque. The degree of free-rise change is then calculated by comparing the shot deviation to the original setting. The results are shown in Table 2.

TABLE 2

Test Process:

Calculated shot size for 5.0 mm plaque = (6.0/12) 5 = 2.5 inches stroke.
Calculated shot time for 5.0 mm plaque = (10.6/12) 5 = 4.42 sec shot.
Gas counterpressure and all other machine settings remain as before.

| Test Results: | Plaque Condition: |
|---|---|
| 5.0 mm plaque weight of 0.356 lb. at 2.5 inches shot | Full part with smooth surface, no flash |
| 7.0 mm plaque weight of 0.361 lb. at 2.6 inches shot | Incomplete part fill w. many dimples front & back of part |
| 7.0 mm plaque weight of 0.357 lb. at 2.7 inches shot | Incomplete part fill w. many dimples front & back of part |
| 7.0 mm plaque weight of 0.387 lb. at 2.8 inches shot | Full part with 1.13 in surface splay, 69 dimples in middle |
| 7.0 mm plaque weight of 0.403 lb. at 2.9 inches shot | Full part with 0.87 in surface splay, 70 dimples in middle |
| 7.0 mm plaque weight of 0.419 lb. at 3.0 inches shot | Full part with 0.50 in surface splay, 63 dimples in middle |
| 7.0 mm plaque weight of 0.423 lb. at 3.1 inches shot | Full part with 0.038 in surface splay, 57 dimples in mid. |
| 7.0 mm plaque weight of 0.431 lb. at 3.2 inches shot | Full part with no splay, 43 dimples in middle of surface |
| 7.0 mm plaque weight of 0.471 lb. at 3.3 inches shot | Full part, smooth surface, no flash |

In order to achieve a fully foamed 5.0 mm plaque that has a good surface after gas counterpressure, the amount of cavity fill is minimized to the point where cell structure of the foam is maximized. At the point where the cell structure is maximized, the part still must have good surface appearance and part integrity. As a result of this minimizing effort, the potential for further cell expansion is reduced to the point where the introduction of that same shot size into a larger cavity does not yield any further expansion. The results include detection of quality issues associated with a short shot part.

TABLE 4

| Fillet | Material | Result |
|---|---|---|
| No fillet | Example 4 | Sink marks on A-side surface. |
| No fillet | Example 1 | Fewer sink marks on A-side surface than Example 1/no fillet trial. |
| Fillet | Example 4 | Fewer sink marks on A-side surface than Example 1/no fillet trial. |
| Fillet | Example 1 | Class A surface |

Surprisingly, the combination of this method and this material, when combined with the use of fillets on the ribs and projections on the B-side of the mold surface, results in the desired Class "A" surface on a relatively large article.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for use in manufacturing an article having a surface, a skin and a core, the method comprising:

closing a first mold portion upon a compressible seal disposed between the first mold portion and a second mold portion, the first and second mold portions each having a wall defining a pressurizable mold cavity, the mold cavity having a mold cavity wall, an injection port and a vent;

pressurizing the mold cavity using a pressurizing gas at a first pressure greater than atmospheric pressure;

injecting an injection comprising a mixture of a molten plastic and a blowing agent into the mold cavity through the injection port;

generating a blowing agent gas from the blowing agent to form a plurality of gas cells within the mixture, the plurality of gas cells having an internal pressure less than the first pressure;

waiting for a first period;

venting the pressurizing gas through the vent for a second period, the first pressure being reduced to a second pressure that is less than the internal pressure of the gas cells in order to permit the plurality of gas cells in the injection that are adjacent to the pressurizing gas to expand;

rupturing the plurality gas cells in the injection adjacent to the pressuring gas to form a plurality of ruptured gas cells;

forming the skin adjacent to the mold cavity wall using the ruptured cells, the skin defining a core cavity;

filling the core cavity with the mixture;

solidifying the mixture; and separating the first mold portion from the second mold portion in order to release the article.

2. The method of claim 1, wherein the first period exceeds 1.5 second.

3. The method of claim 1, wherein the second period exceeds 3 seconds.

4. The method of claim 1, wherein the skin has a thickness ranging from 1 to 10 mm.

5. The method of claim 1, wherein the core cavity includes a rib having a width.

6. The method of claim 5, wherein the skin has a thickness, the ratio of the rib width to the skin thickness ranges from 25% to 1000%.

7. The method of claim 1, wherein the blowing agent is an exothermic blowing agent.

8. The method of claim 7, wherein the exothermic blowing agent is a heterogeneous nucleating agent.

9. The method of claim 8, wherein the heterogeneous nucleating agent is an azo-type nucleating agent.

10. The method of claim 9, wherein the azo-type nucleating agent comprises 20 wt. % to 40 wt. % of the mixture.

11. A method for use in manufacturing an article having a surface, a skin, and a core, the method comprising:

closing a first mold portion upon a second mold portion;

the first and second mold portions defining a pressurizable mold cavity having a mold cavity wall, at least one injection port, and a vent, the injection port and the vent being spaced apart, at least one mold portion further including a rib having a width;

pressurizing the mold cavity at a first pressure;

injecting a plastic composition and a blowing agent through at least one injection port into the mold cavity;

foaming the plastic composition, the foam having a plurality of gas cells, each gas cell having an internal pressure ranging from above atmospheric pressure to less than the first pressure;

waiting for a first period;

venting the mold cavity to a second pressure being less than the internal pressures of the gas cells;

reducing the second pressure at a predetermined rate forming a skin contacting the mold cavity wall, the skin having a thickness, the ratio of the mold cavity's rib width to the skin's thickness ranging from 50% to 300%, the skin defining a core cavity;

filling the core cavity with the plastic composition and blowing agent gas mixture;

solidifying the mixture; and separating the first mold portion from the second mold portion in order to release the article.

12. The method of claim 11, wherein the first pressure ranges from 625 Pa to 2500 Pa.

13. The method of claim 12, wherein the mold cavity ranges in size from 650 $cm^2$ to 6,450 $cm^2$.

14. The method of claim 11, wherein the solidified mixture includes gas cells having a size range from 0.035 mm to 1 mm.

15. The method of claim 11, wherein the solidified mixture includes gas cells having a size range from 0.050 mm to 0.3 mm.

16. The method of claim 11, wherein the blowing agent includes an azodicarbonamide.

17. The method of claim 11, wherein the plastic comprises a polyolefin.

* * * * *